United States Patent Office 2,813,125
Patented Nov. 12, 1957

2,813,125
ALIPHATIC KETONE PRODUCTION

Carl W. Christensen, Hinsdale, and Edgar S. Hammerberg and Russell Chesrown, Chicago, Ill., assignors to Armour and Company, Chicago, Ill., a corporation of Illinois No Drawing. Application September 26, 1956,
Serial No. 612,106

9 Claims. (Cl. 260—593)

This invention relates to the purification of aliphatic ketones. In one of its preferred aspects this invention relates to the purification of crude ketones produced by the treatment of straight-chain fatty acids having from 6 to 25 carbon atoms with iron. In another of its aspects this invention relates to an improved process for the production of high molecular weight aliphatic ketones.

The preparation of aliphatic ketones by the treatment of aliphatic monocarboxylic acids with iron has been long known in the art. The principal chemical reaction involved is the dehydrocarboxylation of two molecules of acid to form the ketone. However, several side reactions occur which result in the formation of iron soaps, hydrocarbons, tars, etc. One of the primary reasons why the process has not enjoyed commercial popularity is the difficulty and cost of purifying the crude ketone. The iron compounds in the crude product are very finely divided and either pass through or plug the filter before an appreciable amount of ketone passes through. The use of various filter aids such as clays and diatomaceous earths have proved unsuccessful in solving the problem. Heretofore it has been necessary to first convert the iron soaps in the crude ketone to sodium soaps with sodium hydroxide followed by neutralization of the sodium soaps and excess sodium hydroxide with mineral acids. The iron oxide particles formed are generally unfilterable and after settling, either before or after dissolution of crude product in a suitable solvent, usually contain an appreciable amount of occluded ketone, the recovery of which is economically unfeasible. Recrystallization of the ketone generally results in a product of high purity and good color. However, the process is expensive.

It is therefore an object of this invention to provide an improved process for the production of aliphatic ketones.

It is another object of this invention to provide an improved method for the purification of crude ketones produced by the treatment of aliphatic monocarboxylic acids with iron.

It is a further object of this invention to provide an improved process for the production of an aliphatic ketone substantially free from iron impurities.

Still another object of this invention is to provide an improved process for the production of high molecular weight aliphatic ketones.

Further and additional objects of this invention will be apparent upon reading the accompanying specification and claims.

According to the present invention an aliphatic ketone is produced by subjecting an aliphatic monocarboxylic acid to the action of iron until reaction is substantially complete, admixing oxalic acid with the crude ketone and maintaining the mixture at an elevated temperature for a period sufficient to modify the filtering characteristics of the iron compounds therein, filtering the thus-treated mixture and recovering a ketone product substantially free from iron impurities.

The acids which can be employed in our process are aliphatic monocarboxylic acids, preferably straight-chain saturated and unsaturated fatty acids containing from 6 to 25 carbon atoms per molecule. Examples of the preferred acids include caproic, caprylic, capric, lauric, myristic, palmitic, stearic, behenic, oleic, linoleic, linolenic, etc. The acids can be employed either as substantially pure compounds or as mixtures of acids, depending upon the nature of the ketone product desired.

The conditions under which conversion of the acid is effected can vary within wide limits, known in the art, depending upon the acids being converted to ketones. The conversion can be effected in either the liquid phase or the vapor phase. In the latter instance iron in finely divided form is employed as a fluidized mass or bed or as a dispersed suspension in the vaporized acids. The reaction is preferably carried out in the liquid phase and at elevated pressures sufficient to maintain the reactants liquid. The vessel is usually carefully vented to avoid excessive pressure build-up. Our preferred temperature range is from 305 to 320° C. when converting $C_{12}$ to $C_{22}$ acids to ketones. We have discovered that when the reaction is carried out in the liquid phase at atmospheric pressure the problem of foaming becomes acute when the concentration of free fatty acid falls below about 35 weight percent. Conventional anti-foam agents fail to solve the problem. We have found, however, that if the pressure is allowed to build up to about 40 to 50 p. s. i. g. before the free fatty acid concentration falls below about 35 weight percent, the problem of foaming is alleviated.

Iron is preferably employed as a finely divided powder of about 90 to 120 mesh size. The iron does not function as a catalyst in the technical sense of the word and is employed in molecular amounts, usually about one-fourth mole of iron per mole of acid.

When the reaction is substantially complete, as indicated by a free fatty acid concentration of about 1 percent, oxalic acid is added to the crude ketone, preferably in an amount of about one-half mole of oxalic acid per mole of iron employed, and the resulting mixture heated to an elevated temperature to modify the filtering characteristics of iron compounds therein, preferably to a temperature in the range of 150 to 225° C. for a period of about 15 to 60 minutes. The conditions of time and temperature can vary within wide limits so long as the desired conversion of iron compounds is effected. Although the preferred temperatures during this step are in the range of 150 to 225° C., it may be observed that temperatures within the broader range of 100–225° C. are also operable. We are unable to explain the mechanism or reactions involved by which the filtering characteristics of the iron impurities in the crude ketone are improved, and do not wish to be bound by any theory or explanation thereof. We do know that if a crude aliphatic ketone containing iron impurities is first treated with oxalic acid, the iron impurities therein can be substantially completely removed without difficulty by a simple filtration step.

The oxalic acid can be added as a solid, a slurry or a solution in a suitable non-reactive solvent. Our preferred practice is to add the oxalic acid as a solid which can be either anhydrous or hydrated. In the latter case it is desirable to first cool the crude ketone below about 95° C. in order to avoid the sudden evolution of water of crystallization therefrom, which will cause foaming. The same precaution should be taken when employing a slurry or solution. In any case the water or solvent is evaporated and removed by the subsequent heating step.

As a means for removing undesirable color in the product due to tars, etc., conventional bleaching agents such as charcoal and diatomaceous earths, for example, Darco and Super-Filtrol can be added at the same time as oxalic acid.

According to a preferred embodiment of our invention, stearic acid is charged to a reaction vessel and heated, with agitation, to a temperature of about 120 to 135° C. at which time one-fourth mole of 120 mesh iron powder mole of stearic acid is added. The vessel is then closed and the mixture heated to a temperature of about 310° C. the pressure being maintained between 40 and 50 p. s. i. g. by venting of gaseous reaction products. When the conversion is substantially complete, as indicated by a free fatty acid concentration of one percent or less, the mixture is allowed to cool to about 95° C. and about one-half mole of commercial oxalic acid per mole of iron powder originally added is mixed with the crude ketone along with a small amount of Darco and Super-Filtrol. The resulting mixture is then heated to about 170° C., excessive pressure over 40 p. s. i. g. being vented down, and maintained for about an hour. The thus-treated mixture is then filtered and a stearone product of good color and purity is recovered after blowing of the filter cake with nitrogen.

EXAMPLE I

A series of runs were made in which a number of different types of fatty acids were converted to ketones by liquid phase treatment with iron at a pressure in the range of 40 to 50 p. s. i. g. In all of the runs the crude ketone was cooled below 95° C. and then mixed with commercial oxalic acid in quantities sufficient to react with iron compounds therein, as hereinbefore described, along with small amounts of Darco and Super-Filtrol. The resulting mixture was then maintained at a temperature of about 170° C. for about one-half hour after which time the thus-treated mixture was filtered to remove iron impurities and other solids. The results of these runs are tabulated in Table I.

EXAMPLE IV 567 parts by weight of crude stearone, produced by liquid phase treatment of stearic acid with iron, was melted and poured into a suitable vessel. To this mixture was added 30 parts by weight of oxalic acid, and the contents heated to 100° C. with continuous stirring and maintained under these conditions for about 30 minutes. The crude mixture was then vacuum filtered through coarse filter paper in a heated Buchner funnel. Filtration time was 9 minutes.

EXAMPLE V

The following test runs demonstrate the need for heating the crude ketone mixture after addition of the oxalic acid:

TEST RUN NO. A

A batch of stearone (lot 3721) was prepared as follows: 50 lbs. of stearic acid and 2.5 lbs. of iron powder were heated in an autoclave to 600° F. while stirring and the evolved gases, carbon dioxide and steam, were vented to the atmosphere. Heating at 600° F. was continued until the fatty acid content of the batch was less than one percent. The batch was then cooled and drained. This product, containing finely divided iron particles, was used in the filtration rate tests listed herewith. Analysis of a filtered sample of lot 3721 showed 99.6% stearone and 0.2% stearic acid.

TEST RUN NO. B 576 g. of crude stearone (lot 3721) was melted and placed in a round-bottom flask (1,000 ml.) together with 30 g. of oxalic acid. With agitator turning, the materials were heated to 275–285° F. The contents of the flask were then poured into a heated Buchner funnel

Table I

| Run No. | Fatty Acid | | Iron Powder, Parts by Wt. | Reaction | | Analysis of Product | | |
|---|---|---|---|---|---|---|---|---|
| | Type | Parts by Wt. | | Temp., °C. | Time, Hrs. | Percent Ketone | Percent Fatty Acid | Color, NPA |
| 1 | Neo-Fat 1-60 [1] | 400 | 20 | 590 | 9 | 95.7 | 0.8 | |
| 2 | do | 400 | 20 | 590 | 11 | 96.3 | 0.5 | 1 |
| 3 | do | 400 | [5] 20 | 590 | 12 | 95.4 | 0.6 | 1.5 |
| 4 | do | 400 | 20 | 595 | 11½ | 95.4 | 0.6 | 1.5 |
| 5 | do | 400 | 20 | 590 | 9 | 96.3 | 0.6 | 2 |
| 6 | do | 400 | 20 | 590 | 8 | 92 | 1.4 | 2 |
| 7 | Neo-Fat 11 [2] | 277 | 18.9 | 590 | 6 | 91.2 | 0.6 | 2 |
| 8 | Pure Oleic | 395 | 20 | 590 | 10 | 96 | 1.1 | 2 |
| 9 | Behenic | 5 | 0.5 | 608 | 6 | 90 | 1.8 | 2.5 |
| 10 | Distilled Animal [3] | 5 | 0.25 | 590 | 15 | 90 | 1.9 | 2 |
| 11 | Neo-Fat 1-56 [4] | 5 | 0.5 | 590 | 11 | 94 | 2.2 | 2 |

[1] A mixture containing 75% stearic, 22% palmitic, and 3% oleic.
[2] C. P. Lauric Acid, contains 4% myristic and 1% capric.
[3] A mixture containing 48% oleic, 26% palmitic, 16% stearic, 6% linoleic, and 2% myristic.
[4] C. P. Palmitic, contains 6% stearic and 4% oleic.
[5] 90 mesh iron powder used.

EXAMPLE II 567 parts by weight of crude stearone, produced by liquid phase treatment of stearic acid with iron, was melted and poured into a suitable vessel. To this mixture was added 30 parts by weight of oxalic acid and the contents heated to about 170° C. with continuous stirring and maintained under these conditions for about 30 minutes. The crude mixture was then vacuum filtered through coarse filter paper in a heated Buchner funnel. Filtration time was 5 minutes.

EXAMPLE III 567 parts by weight of crude stearone was treated similarly as in Example II, except that oxalic acid was eliminated. Filtration time was 50 minutes. Thus it is apparent that treatment of the crude stearone with oxalic acid reduced the filtration time to one tenth of that required without oxalic acid treatment.

and filtered. (Pressure in filter flask was 45 mm. Hg abs.) Voltage on electric heating circuit was 28 volts.

Start of filtration 1:14 p. m.
Filtration complete 1:21 p. m.
Total filtration time was 7 minutes
Filter cake weighed 72 grams

TEST RUN NO. C 576 g. of crude stearone (lot 3721) was melted in a beaker. 30 g. of oxalic acid was stirred in and the contents of the beaker were then poured into a heated Buchner funnel and filtered. (Pressure in filter flask was 45 mm. Hg abs.) Voltage on electric heating circuit was 28 volts.

Start of filtration 12:50 p. m.
Filtration complete 3:22 p. m.
Total filtration time was 2 hours, 32 minutes
Filter cake weighed 76 grams

TEST RUN NO. D (Repeat of Run No. C) 576 g. of crude stearone (lot 3721) was melted in a beaker. 30 g. of oxalic acid was stirred in and the contents of the beaker were then poured into a heated Buchner funnel and filtered. (Pressure in filter flask was 42–47 mm. Hg abs.) Voltage on electric heating circuit was 28 volts.

Start of filtration 12:45 p. m.
Filtration complete 3:35 p. m.
Total filtration time was 2 hours, 50 minutes
Filter cake weighed 68 grams The foregoing examples are intended to be illustrative of the underlying principles of our invention and should not be construed as unduly limiting. While our invention has been described and exemplified in terms of its preferred embodiments, those skilled in the art will appreciate that modifications can be made without departing from the spirit and scope thereof.

This applictaion is a continuation-in-part of our co-pending application Serial No. 358,952, filed June 1, 1953, now abandoned.

We claim:

1. An improved process for the purification of a crude ketone produced by the treatment of an aliphatic monocarboxylic acid having from 6 to 25 carbon atoms with iron, which comprises admixing the crude ketone with oxalic acid, subjecting the mixture to a temperature in the range of 150 to 225° C. for a period of at least 15 minutes, and filtering the thus-treated mixture to remove iron impurities.

2. An improved process for the purification of a crude ketone produced by the treatment in liquid phase of a straight-chain aliphatic monocarboxylic acid having 6 to 25 carbon atoms with iron, which comprises admixing the crude ketone with solid oxalic acid, subjecting the mixture to a temperature of about 170° C. for a period of about 30 minutes, filtering the thus-treated mixture and recovering a ketone product substantially free from iron impurities.

3. A process according to claim 2 wherein crude stearone is purified.

4. A process according to claim 2 wherein crude palmitone is purified.

5. A process according to claim 2 wherein crude laurone is purified.

6. A process according to claim 2 wherein crude oleone is purified.

7. A process according to claim 2 wherein crude behenone is purified.

8. An improved process for the production of an aliphatic ketone comprising subjecting an aliphatic monocarboxylic acid having from 6 to 25 carbon atoms in the liquid phase to the action of iron until reaction is substantially complete, admixing solid oxalic acid with the reaction mixture at a temperature below 95° C., heating the resulting mixture to a temperature of about 170° C. for about 30 minutes, filtering the thus-treated mixture and recovering a ketone product substantially free from iron impurities.

9. An improved process for the purification of a straight-chain high molecular weight ketone contaminated with iron impurities, which comprises admixing said ketone with oxalic acid, subjecting the mixture to a temperature in the range of 100°–225° C., and filtering the thus-treated mixture to remove iron impurities.

References Cited in the file of this patent

UNITED STATES PATENTS

| | | |
|---|---|---|
| 1,058,225 | Easterfield | Apr. 8, 1913 |
| 2,413,009 | Taussky | Dec. 24, 1946 |

OTHER REFERENCES

Chem. Abstracts, vol. 22, pg. 708 (1928).
Chem. Abstracts, vol. 30, pg. 2173 (1936).
Chem. Abstracts, vol. 30, pg. 7009 (1936).